(12) United States Patent
Xiao et al.

(10) Patent No.: US 9,058,115 B1
(45) Date of Patent: Jun. 16, 2015

(54) SYSTEMS AND METHODS FOR MULTI-DIMENSIONAL DATA PROCESSOR OPERATIONAL MARGINALIZATION

(71) Applicant: LSI Corporation, San Jose, CA (US)

(72) Inventors: Jun Xiao, Fremont, CA (US); Shu Li, San Jose, CA (US); Fan Zhang, Milpitas, CA (US); George Mathew, San Jose, CA (US)

(73) Assignee: LSI Corporation, San Jose, CA (US)

( * ) Notice: Subject to any disclaimer, the term of this patent is extended or adjusted under 35 U.S.C. 154(b) by 43 days.

(21) Appl. No.: 14/109,570

(22) Filed: Dec. 17, 2013

Related U.S. Application Data

(60) Provisional application No. 61/913,866, filed on Dec. 9, 2013.

(51) Int. Cl.
| | |
|---|---|
| *G11B 5/09* | (2006.01) |
| *G11B 5/035* | (2006.01) |
| *G06F 3/06* | (2006.01) |
| *G11B 20/10* | (2006.01) |

(52) U.S. Cl.
CPC ........ *G06F 3/0619* (2013.01); *G11B 20/10037* (2013.01); *G06F 3/064* (2013.01); *G06F 3/0676* (2013.01)

(58) Field of Classification Search
CPC .... G11B 20/10009; G11B 5/035; G11B 5/09; G11B 20/10527; G11B 2220/90
USPC ............. 360/32, 39, 65, 40, 46, 41, 48, 77.12
See application file for complete search history.

(56) References Cited

U.S. PATENT DOCUMENTS

| | | | |
|---|---|---|---|
| 7,064,913 B2 | 6/2006 | Gunderson et al. | |
| 7,372,651 B2 | 5/2008 | Gunderson et al. | |
| 7,570,447 B2 | 8/2009 | Koga et al. | |
| 7,990,648 B1 | 8/2011 | Wang | |
| 8,650,138 B2 * | 2/2014 | Momma et al. ................ | 706/12 |
| 2003/0128448 A1 | 7/2003 | Gunderson et al. | |
| 2004/0003724 A1 | 1/2004 | Ellis | |
| 2005/0117263 A1 | 6/2005 | Seigler | |
| 2005/0201003 A1 | 9/2005 | Shishida et al. | |
| 2010/0211803 A1 | 8/2010 | Lablans | |
| 2013/0047053 A1 | 2/2013 | Jin et al. | |
| 2013/0191618 A1 | 7/2013 | Yang et al. | |

OTHER PUBLICATIONS

U.S. Appl. No. 13/722,207, filed Dec. 20, 2012, Singleton, Jefferson. et al.
U.S. Appl. No. 13/893,693, filed May 14, 2013, Jun Xiao, Unpublished.
U.S. Appl. No. 13/784,369, filed Mar. 4, 2013, Jun Xiao, Unpublished.
U.S. Appl. No. 13/722,207, filed Dec. 20, 2012, Jefferson E. Singleton, Unpublished.
U.S. Appl. No. 13/710,351, filed Dec. 10, 2012, Lu Lu, Unpublished.
U.S. Appl. No. 13/686,164, filed Nov. 27, 2012, George Mathew, Unpublished.

* cited by examiner

*Primary Examiner* — Nabil Hindi
(74) *Attorney, Agent, or Firm* — Hamilton DeSanctis & Cha

(57) ABSTRACT

Systems, methods, devices, circuits for data processing, and more particularly to data processing including operational marginalization capability.

20 Claims, 10 Drawing Sheets

SYSTEMS AND METHODS FOR MULTI-DIMENSIONAL DATA PROCESSOR OPERATIONAL MARGINALIZATION

CROSS REFERENCE TO RELATED APPLICATIONS

The present application claims priority to (is a non-provisional of) U.S. Pat. App. No. 61/913,866 entitled "Systems and Methods for Multi-Dimensional Data Processor Operational Marginalization", and filed Dec. 9, 2013 by Xia et al. The entirety of the aforementioned provisional patent application is incorporated herein by reference for all purposes.

FIELD OF THE INVENTION

Embodiments are related to systems and methods for data processing, and more particularly to systems and methods for controlled degradation of a data processing system.

BACKGROUND

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. The data processing includes application of various data processing algorithms to recover originally written data. Such processing results in a very small number of errors that in some cases are due to corruption of the originally received data. Such a level of errors make it difficult to make adjustments to either correct for the type of errors or make it difficult to characterize the quality of a device.

Hence, for at least the aforementioned reasons, there exists a need in the art for advanced systems and methods for data processing.

SUMMARY

Embodiments are related to systems and methods for data processing, and more particularly to systems and methods for controlled degradation of a data processing system.

Various embodiments of the present invention provide data processing systems that include: a first analog to digital converter circuit operable to convert a first input into a first series of digital samples; a second analog to digital converter circuit operable to convert a second input into a second series of digital samples; a multi-dimensional system marginalization circuit operable to apply a marginalization algorithm to a combination of the first series of digital samples and the second series of digital samples to yield a first marginalized input corresponding to the first series of digital samples and a second marginalized input corresponding to the second series of digital samples; and a processing circuit operable to apply a multi-dimensional data processing algorithm to a combination of the first marginalized input and the second marginalized input to yield a data output.

This summary provides only a general outline of some embodiments of the invention. The phrases "in one embodiment," "according to one embodiment," "in various embodiments," "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1A:
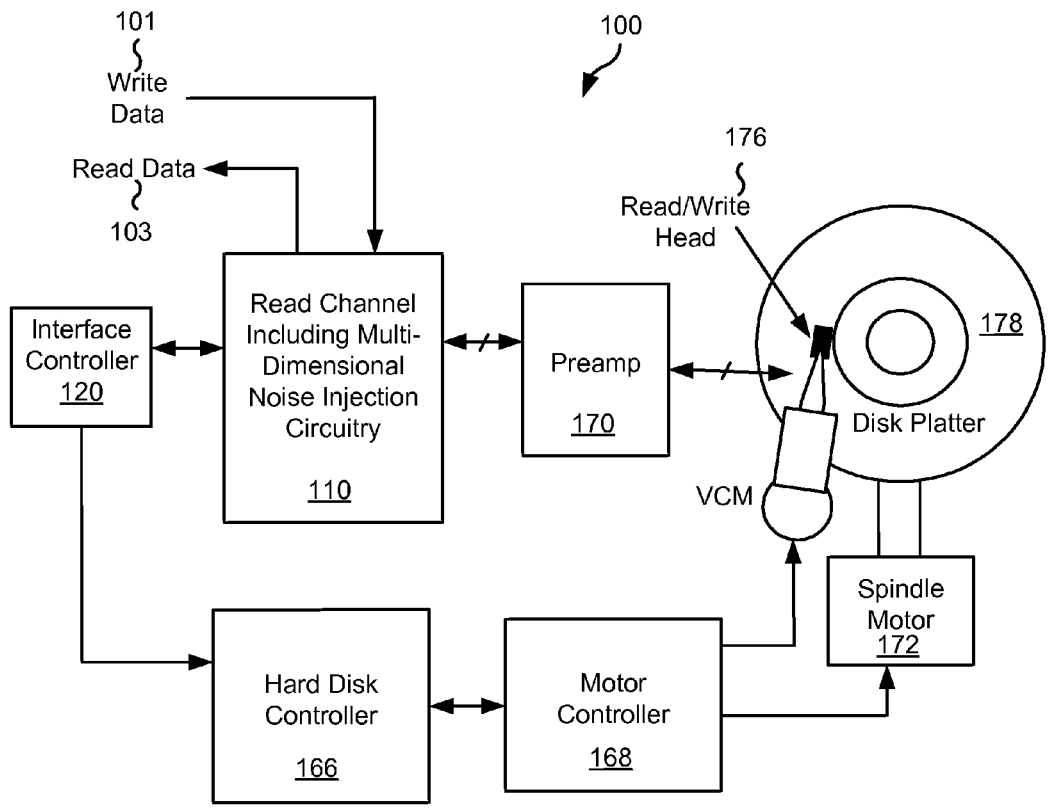
FIG. 1a shows a storage system including multi-dimensional noise injection circuitry in accordance with various embodiments of the present invention.

Embodiments are related to systems and methods for data processing, and more particularly to systems and methods for controlled degradation of a data processing system.

Various embodiments of the present invention provide data processing systems that include: a first analog to digital converter circuit operable to convert a first input into a first series of digital samples; a second analog to digital converter circuit operable to convert a second input into a second series of digital samples; a multi-dimensional system marginalization circuit operable to apply a marginalization algorithm to a combination of the first series of digital samples and the second series of digital samples to yield a first marginalized input corresponding to the first series of digital samples and a second marginalized input corresponding to the second series of digital samples; and a processing circuit operable to apply a multi-dimensional data processing algorithm to a combination of the first marginalized input and the second marginalized input to yield a data output.

In some instances of the aforementioned embodiments, the multi-dimensional system marginalization circuit includes: a first loop detector circuit operable to apply a loop detection algorithm to a first loop input derived from the first series of digital samples to yield a first loop output; a second loop detector circuit operable to apply the loop detection algorithm to a second loop input derived from the second series of digital samples to yield a first loop output; and a multi-dimensional signal marginalization circuit operable to marginalize the first loop input based upon a combination of the first loop output, the first loop input, and the second loop input to yield a first marginalized output; and to marginalize the second loop input based upon a combination of the second loop output, the first loop input and the second loop input to yield a second marginalized output.

In some cases, the multi-dimensional system marginalization circuit further includes a multi-dimensional joint equalizer circuit operable to apply a multi-dimensional equalization algorithm to a combination of the first series of digital samples and the second series of digital samples to yield the first loop input and the second loop input to yield a first equalized output corresponding to the first series of digital samples and a second equalized output corresponding to the second series of digital samples. In some such cases, the multi-dimensional signal marginalization circuit includes a vector by array multiplication circuit operable to multiply an array of errors derived from a combination of the first loop output, the second loop output, the first equalized output and the second equalized output by a marginalization matrix to yield a first marginalized error corresponding to the first series of digital samples and a second marginalized error corresponding to the second series of digital samples; a first summation circuit operable to sum the first equalized output with the first marginalized error to yield the first marginalized input; and a second summation circuit operable to sum the second equalized output with the second marginalized error to yield the second marginalized input. In one or more cases, the aforementioned marginalization matrix is user programmable. In various cases, the marginalization matrix is a matrix of values each less than unity.

In one or more cases, the multi-dimensional system marginalization circuit includes: a first loop detector circuit operable to apply a loop detection algorithm to the first series of digital samples to yield a first loop output; a first one dimensional marginalization circuit operable to modify the first series of digital samples to yield a first marginalized series of digital samples based at least in part on the first series of digital samples and a first marginalization value; a second loop detector circuit operable to apply the loop detection algorithm to the second series of digital samples to yield a second loop output; and a second one dimensional marginalization circuit operable to modify the second series of digital samples to yield a second marginalized series of digital samples based at least in part on the second series of digital samples and a second marginalization value. In some such cases, the first marginalization value is user programmable. In various of such cases, the first marginalization value is less than unity. In one or more cases, the multi-dimensional system marginalization circuit further includes a multi-dimensional joint equalizer circuit operable to apply a multi-dimensional equalization algorithm to a combination of the first marginalized series of digital samples and the second marginalized series of digital samples to yield a first equalized output corresponding to the first series of digital samples and a second equalized output corresponding to the second series of digital samples. In particular cases, the first one dimensional marginalization circuit includes: a first summation circuit operable to subtract an ideal value derived from the first series of digital samples to yield an error value; a multiplication circuit operable to multiply the error value by the first marginalization value to yield a product; and a second summation circuit operable to sum the product with the first series of digital samples to yield the first marginalized series of digital samples.

Other embodiments of the present invention provide methods for data processing that include: receiving a first input derived from a first read head disposed in relation to a storage medium; receiving a second input derived from a second read head disposed in relation to the storage medium; generating a first noise component based at least in part on a combination of data derived from both the first input and second input; generating a second noise component based at least in part on the combination of data derived from both the first input and second input; multiplying a vector of the first noise component and the second noise component by a marginalization matrix to yield a first marginalized noise component corresponding to the first input and a second marginalized noise component corresponding to the second input; summing the first input with the first marginalized noise component to yield a first marginalized output; and summing the second input with the second marginalized noise component to yield a second marginalized output.

Turning to FIG. 1a, a storage system 100 including a read channel circuit 110 having multi-dimensional noise injection circuitry is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

Figure 1B:
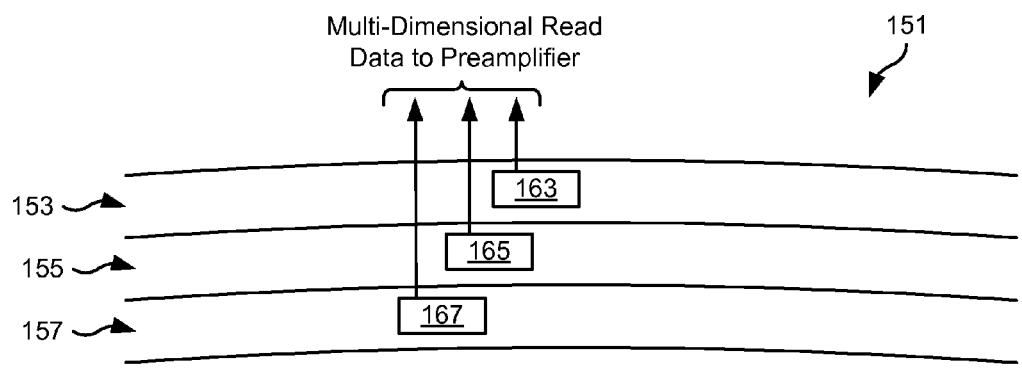
FIG. 1b shows a number of heads aligned to respective tracks on a storage medium from which a multi-dimensional input may be derived.

In a typical read operation, read/write head assembly 176 is accurately positioned by motor controller 168 over multiple data tracks on disk platter 178. Read/write head assembly 176 includes two or more read heads capable of sensing data from two or more tracks at the same time. An example 151 of read/write assembly 176 including three read heads 163, 165, 167 aligned over three consecutive tracks 153, 155, 157 of a disk platter is shown in FIG. 1b. Each of the three read heads senses data from the corresponding track. Referring again to FIG. 1a, motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data tracks, magnetic signals representing data on the tracks of disk platter 178 are sensed by read/write head assembly 176 as disk platter 178 is rotated by spindle motor 172. The multiple streams of sensed magnetic signals are provided as a continuous, minute analog signals representative of the magnetic data on the respective tracks of disk platter 178. These streams of minute analog signals is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signals to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

As part of a device characterization process, read channel circuit 110 selects a test control causing a noise component to be added to data being accessed from disk platter 178. The noise being added is designed to raise a minimal error rate generally yielded by read channel circuit 110 to an error rate that can meaningfully characterize storage system 100. The noise being added is generated based upon data being accessed from disk platter 178 and is thus more representative of actual system operation than other types of noise that may be added. In some cases, the read channel circuit may include circuitry similar to that discussed in relation to FIGS. 3a-3b, FIGS. 4a-4b and/or FIGS. 6a-6b as are described below to perform multi-dimensional marginalization; and/or may operate similar to the methods discussed below in relation to FIGS. 2a-2b and/or 5a-5b.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2A:
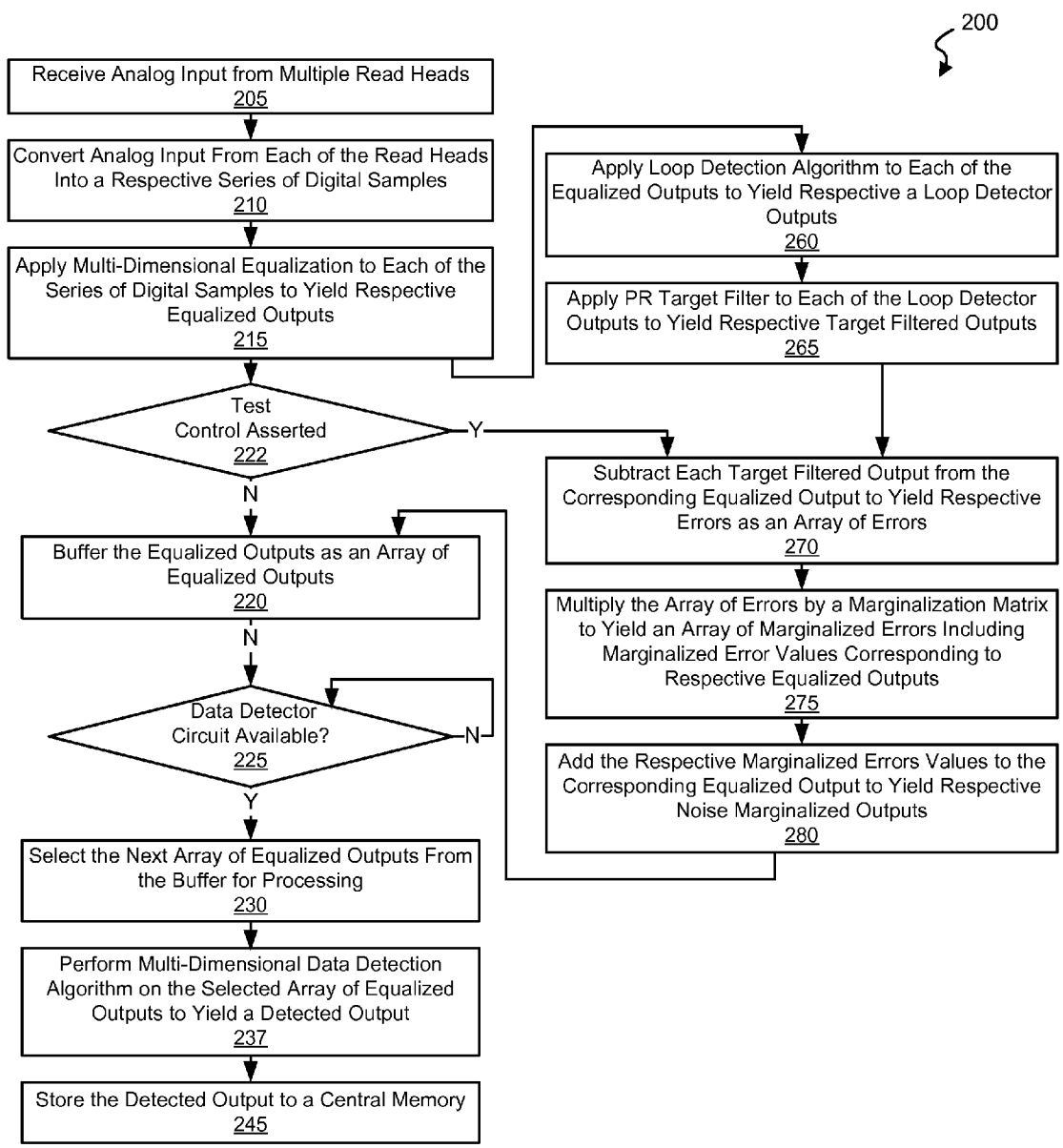
FIGS. 2a-2b are flow diagrams showing a method for data processing relying on multi-dimensional noise injection in accordance with some embodiments of the present invention.
Figure 2B:
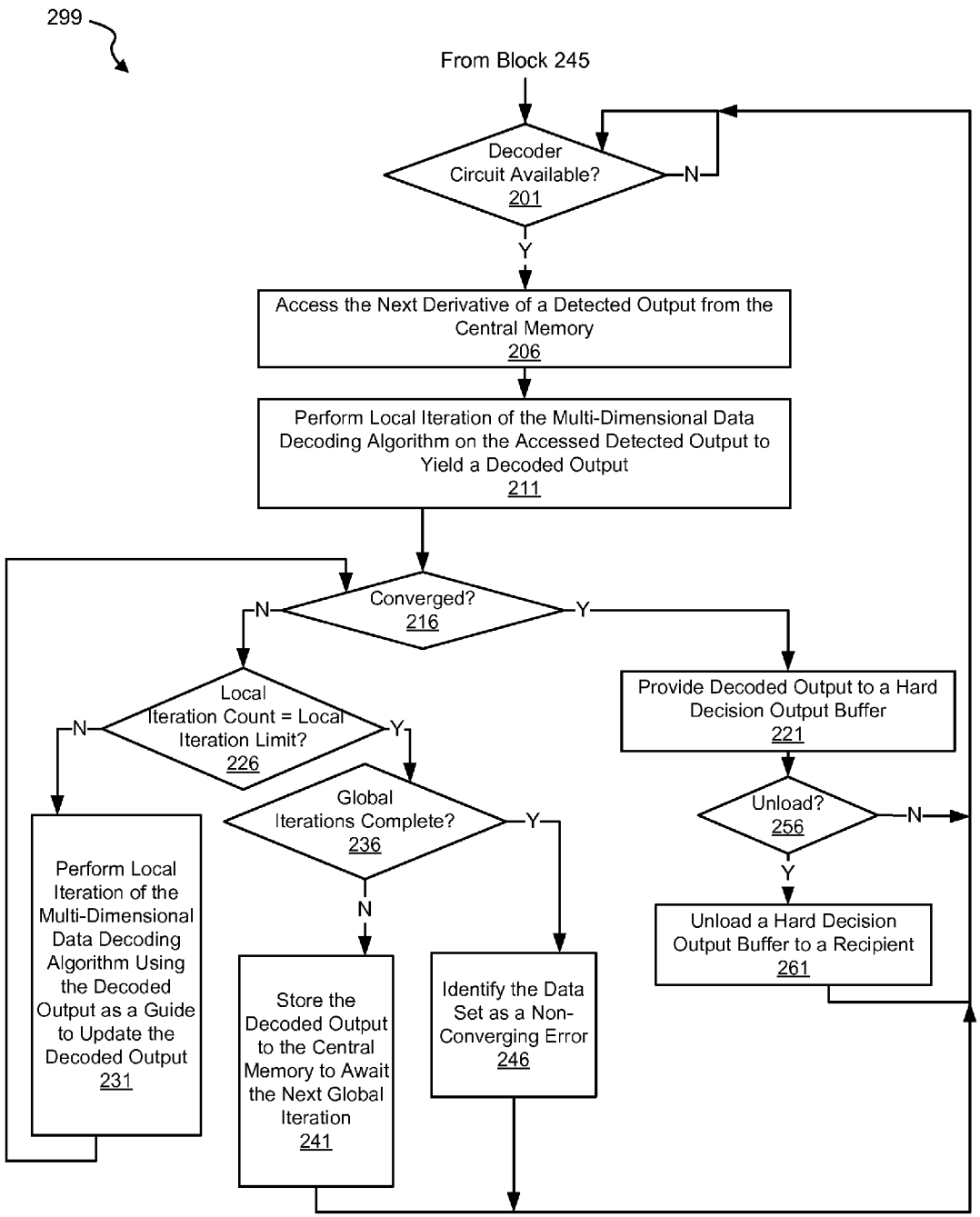

Turning to FIGS. 2a-2b are flow diagrams 200, 299 showing a method for data processing relying on multi-dimensional noise injection in accordance with some embodiments of the present invention. Following flow diagram 200 of FIG. 2a, multiple analog inputs are received from respective read heads (block 205). The analog inputs may be derived from, for example, a storage medium. Based upon the disclosure provided herein, one of ordinary skill in the art will recognize a variety of sources of the analog inputs. Each of the analog inputs is converted to a respective series of digital samples (block 210). This conversion may be done using analog to digital converter circuits or systems as are known in the art. Of note, any circuit known in the art that is capable of converting an analog signal into a series of digital samples representing the received analog signal may be used. The resulting sets of digital samples from the analog to digital converter circuits are provided to a multi-dimensional equalization circuit.

The multi-dimensional equalization circuit applies a multi-dimensional equalization to each of the series of digital samples incorporating information from the other series of digital samples to yield respective equalized outputs (block 215). In some embodiments of the present invention, the equalization is done using a multi-dimensional digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention. The following equation represents the array of equalized outputs (y(k,n)):

$$y(k,n)=w(k)^T \cdot x(n),$$

where k indicates a particular set of the series of digital samples (i.e., k indicates a read head), and n indicates a particular element in the $k^{th}$ series of digital samples. Thus, where a two-dimensional system is implemented that includes two read heads, the value of k is one or two. The term $w(k)^T$ represents the multi-dimensional equalization, and x(n) represents the digital samples at the output of the analog to digital converter circuit. In particular, $$w(k)^T=[w(k,1)^T,w(k,2)^T,\ldots,w(k,N)^T]^T,$$

is NP×1 vector of equalizer for the $k^{th}$ track of a storage medium, where w(k,j) is P×1 vector of the equalizer filter for the data from the $j^{th}$ read head. Further, the following equation represents the value of x(n):

$$x(n)^T=[x(n,1)^T,x(n,2)^T,\ldots,x(n,N)^T]^T,$$

where x(n,j) is Px1 vector of the digital samples from the analog to digital converter circuit for the $j^{th}$ read head.

Where the multi-dimensional equalizer is a two dimensional equalizer, it is designed to use a two-dimensional target. In this situation, the equalized output is represented as follows:

$$y(k,n)=g(k)^T \cdot a(n),$$

where:

$$g(k)^T=[g(k,1)^T,g(k,2)^T,\ldots,g(k,N)^T]^T,$$

is NLx1 vector of a two dimensional target for the $k^{th}$ track of a storage medium, and a(n):

$$a(n)^T=[a(n,1)^T,a(n,2)^T,\ldots,a(n,N)^T]^T,$$

where NLx1 vector of the hard decision data (output of the loop detector circuits). L is the length of the target.

A loop detection algorithm is applied individually to each of the equalized outputs to yield respective loop detector outputs (block 260). A loop detector applying the loop detection algorithm that generates decisions on data bits. The loop control circuits in the channel use these decisions to generate feedback for driving the loops in the correct direction. The loop detection algorithm may be applied by any circuit known in the art that applies some type of algorithm designed to return a representation of the data from which the analog input was derived. In one particular embodiment of the present invention, the loop detection algorithm is operable to determine bit decisions used to aid in timing feedback and other operations designed to align the sampling related to the analog to digital conversion, and/or to adjust a gain applied by an analog front end circuit. Based upon the disclosure provided herein, one of ordinary skill in the art will recognize a variety of loop detection algorithms capable of providing a representation of the data from which the analog input was derived that may be used in relation to different embodiments of the present invention.

A partial response target filtering is applied to each loop detector output to yield respective target filtered outputs (block 265). The partial response target filtering may be done by any circuit known in the art that is capable of applying target based filtering to an input signal to yield an output conformed to a target. The resulting target filtered output is an ideal approximation of the equalized output.

It is determined whether a test control is asserted (block 222). Where the test control is asserted (block 222), each of the target filtered outputs is subtracted from a respective one of the equalized outputs to yield respective errors as an array of errors (block 270). The errors may be calculated in accordance with the following equation:

$$e(k,n)=y(k,n)-y_{ideal}(k,n),$$

where e(k, n) is the error, y(k, n) is the equalized output, and $y_{ideal}$(k, n) is the target filtered output. The array of errors is multiplied by a marginalization matrix to yield an array of marginalized errors (block 275). The array of marginalized errors may be calculated in accordance with the following equation:

$$e'(k,n)=A \cdot e(k,n),$$

where A is the marginalization matrix and e'(k,n) is the array of marginalized errors. The following is an example of a two-dimensional marginalization matrix:

$$A = \begin{Bmatrix} \alpha_{1,1}, & \alpha_{1,2} \\ \alpha_{2,1}, & \alpha_{2,2} \end{Bmatrix}.$$

In the simple case where interference in the data from the heads is not addressed, the aforementioned two-dimensional marginalization matrix can be reduced to:

$$A = \begin{Bmatrix} \alpha_{1,1}, & 0 \\ 0 & \alpha_{2,2} \end{Bmatrix}.$$

The array of marginalized errors includes a marginalization error corresponding to each of the read heads from which the analog data was originally received. These marginalized errors are added to the corresponding equalized output to yield respective noise marginalized outputs (block 280). The noise marginalized outputs y'(k,n) may be calculated in accordance with the following equation:

$$y'(k,n)=y(k,n)+e'(k,n).$$

These respective noise marginalized outputs is used to replace the respective equalized outputs.

Whether or not the test control is asserted (block 222), the equalized outputs (modified or unmodified) are buffered as an array of equalized outputs (block 220). The array of equalized outputs includes one equalized output corresponding to each of the multiple read heads. It is determined whether a data detector circuit is available to process the buffered equalized output (block 225). Where a data detector circuit is available to process a data set (block 225), the next available array of equalized outputs from the buffer is selected for processing (block 230). A multi-dimensional data detection algorithm is then applied to the selected array of equalized outputs to yield a detected output (block 237). The data detection algorithm may be, for example, a Viterbi algorithm data detection or a maximum a posteriori data detection algorithm. The detected output (or a derivative thereof) is then stored to a central memory (block 245).

Turning to FIG. 2b and following flow diagram 299, it is determined whether a data decoder circuit is available (block 201) in parallel to the previously described data detection process of FIG. 2a. The data decoder circuit may be, for example, a low density parity check data decoder circuit as are known in the art. Where the data decoder circuit is available (block 201) the next derivative of a detected output is selected from the central memory (block 206). The derivative of the detected output may be, for example, an interleaved (shuffled) version of a detected output from the data detector circuit. A first local iteration of a data decoding algorithm is applied by the data decoder circuit to the selected detected output to yield a decoded output (block 211). It is then determined whether the decoded output converged (e.g., resulted in the originally written data as indicated by the lack of remaining unsatisfied checks) (block 216).

Where the decoded output converged (block 216), it is provided as a decoded output codeword to a hard decision output buffer (e.g., a re-ordering buffer) (block 221). It is determined whether the received output codeword is either sequential to a previously reported output codeword in which case reporting the currently received output codeword immediately would be in order, or that the currently received output codeword completes an ordered set of a number of codewords in which case reporting the completed, ordered set of codewords would be in order (block 256). Where the currently received output codeword is either sequential to a previously reported codeword or completes an ordered set of codewords (block 256), the currently received output codeword and, where applicable, other codewords forming an in order sequence of codewords are provided to a recipient as an output (block 261).

Alternatively, where the decoded output failed to converge (e.g., errors remain) (block 216), it is determined whether the number of local iterations already applied equals the maximum number of local iterations (block 226). In some cases, a default seven local iterations are allowed per each global iteration. Based upon the disclosure provided herein, one of ordinary skill in the art will recognize another default number of local iterations that may be used in relation to different embodiments of the present invention. Where another local iteration is allowed (block 226), the multi-dimensional data decoding algorithm is applied to the selected data set using the decoded output as a guide to update the decoded output (block 231). The processes of blocks starting at block 216 are repeated for the next local iteration.

Alternatively, where all of the local iterations have occurred (block 226), it is determined whether all of the global iterations have been applied to the currently processing data set (block 236). Where the number of global iterations has not completed (block 236), the decoded output is stored to the central queue memory circuit to await the next global iteration (block 241). Alternatively, where the number of global iterations has completed (block 236), an error is indicated and the data set is identified as non-converging (block 246).

Figure 3A:
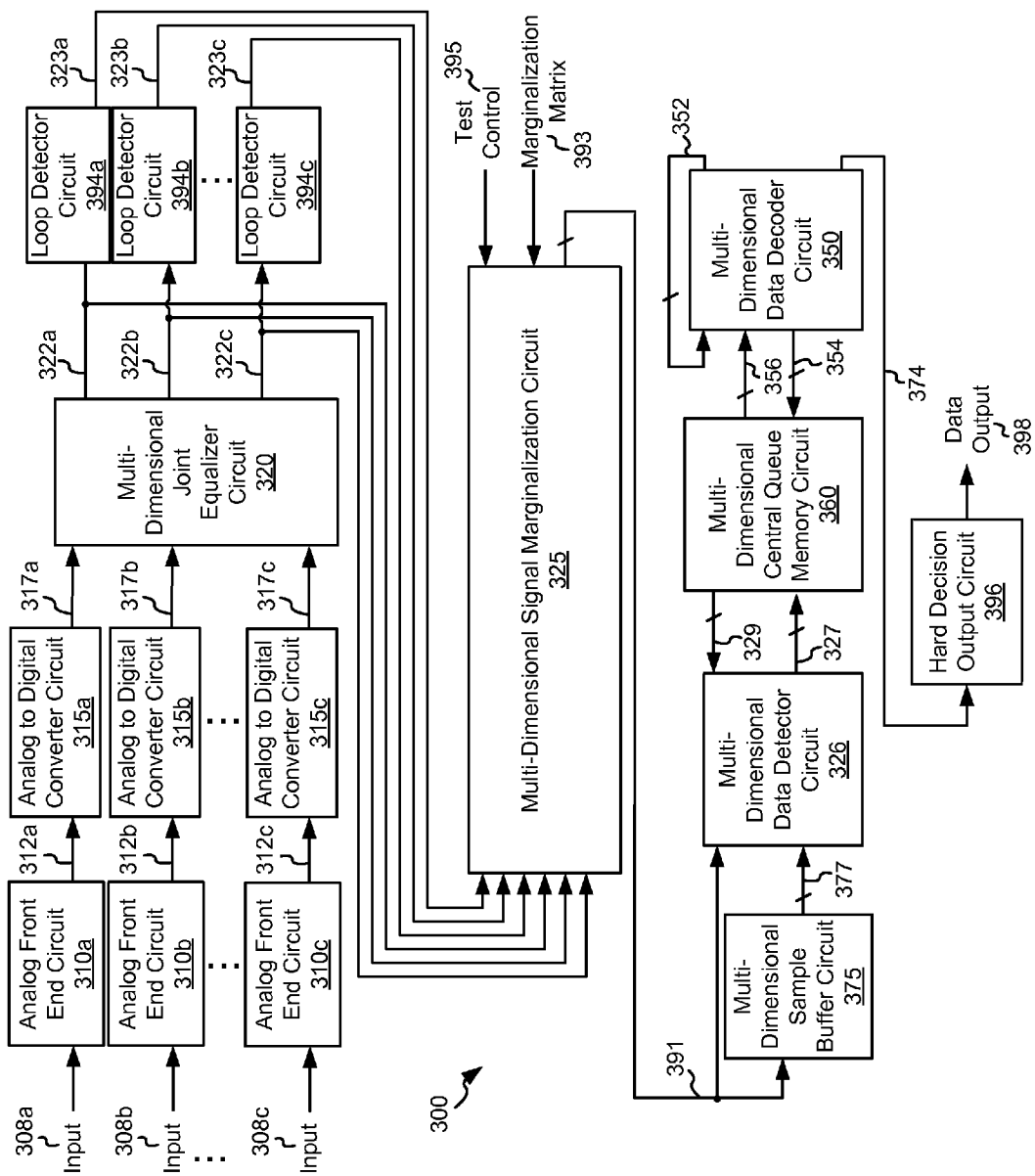
FIG. 3a shows a data processing circuit including a multi-dimensional signal marginalization circuit in accordance with some embodiments of the present invention.

Turning to FIG. 3a, a data processing circuit 300 is shown that includes a multi-dimensional signal marginalization circuit 325 in accordance with some embodiments of the present invention. Data processing circuit 300 includes a number of analog front end circuits 310 (310a, 310b, 310c) that receive respective ones of analog inputs 308 (308a, 308b, 308c) from respective read heads (not shown). Each of analog front end circuits 310 processes a respective one of the analog signals 308 and provides a processed analog signal 312 (one of 312a, 312b, 312c) to a respective analog to digital converter circuit 315 (one of 315a, 315b, 315c). Each of analog front end circuits 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog input signal 308 is derived from a read/write head assembly (not shown) that is disposed in relation to a storage medium (not shown). Based upon the disclosure provided herein, one of ordinary skill in the art will recognize a variety of sources from which the analog input signals 308 may be derived.

Each of the analog to digital converter circuits 315 converts a respective one of the processed analog signals 312 into a respective corresponding series of digital samples 317 (one of 317a, 317b, 317c). Each of the analog to digital converter circuits 315 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Each of the series of digital samples 317 are provided to a multi-dimensional joint equalizer circuit 320. Multi-dimensional joint equalizer circuit 320 applies a multi-dimensional equalization algorithm to the sets of digital samples 317a, 317b, 317c to yield equalized outputs 322a, 322b, 322c each corresponding to one of analog inputs 308a, 308b, 308c. In some embodiments of the present invention, multi-dimensional joint equalizer circuit equalizer circuit 320 is a multi-dimensional digital finite impulse response filter circuit as are known in the art.

Equalized output 322a is provided to a loop detector circuit 394a, equalized output 322b is provided to a loop detector circuit 394b, and equalized output 322c is provided to a loop detector circuit 394c. Each of loop detector circuits 394 may be any circuit known in the art that applies some type of algorithm designed to return a representation of the data from which a corresponding input signal 308 was derived. In one particular embodiment of the present invention, each of the decisions from the loop detector circuits 394 may be used to determine timing feedback and other operations designed to align the sampling of the corresponding analog to digital converter circuit 315 (e.g., output 323a of loop detector circuit 394a provided to analog to digital converter circuit 315a) with the received data set, and/or to adjust a gain applied by the corresponding analog front end circuit 310 (e.g., output 323a of loop detector circuit 394a provided to analog to analog front end circuit 310a). Based upon the disclosure provided herein, one of ordinary skill in the art will recognize a variety of circuits capable of providing a representation of the data from which analog signal 308 was derived that may be used in relation to different embodiments of the present invention. Each of the loop detector circuits 394 provides a respective ideal output 323 that corresponds to an expected value based upon filtering.

Figure 3B:
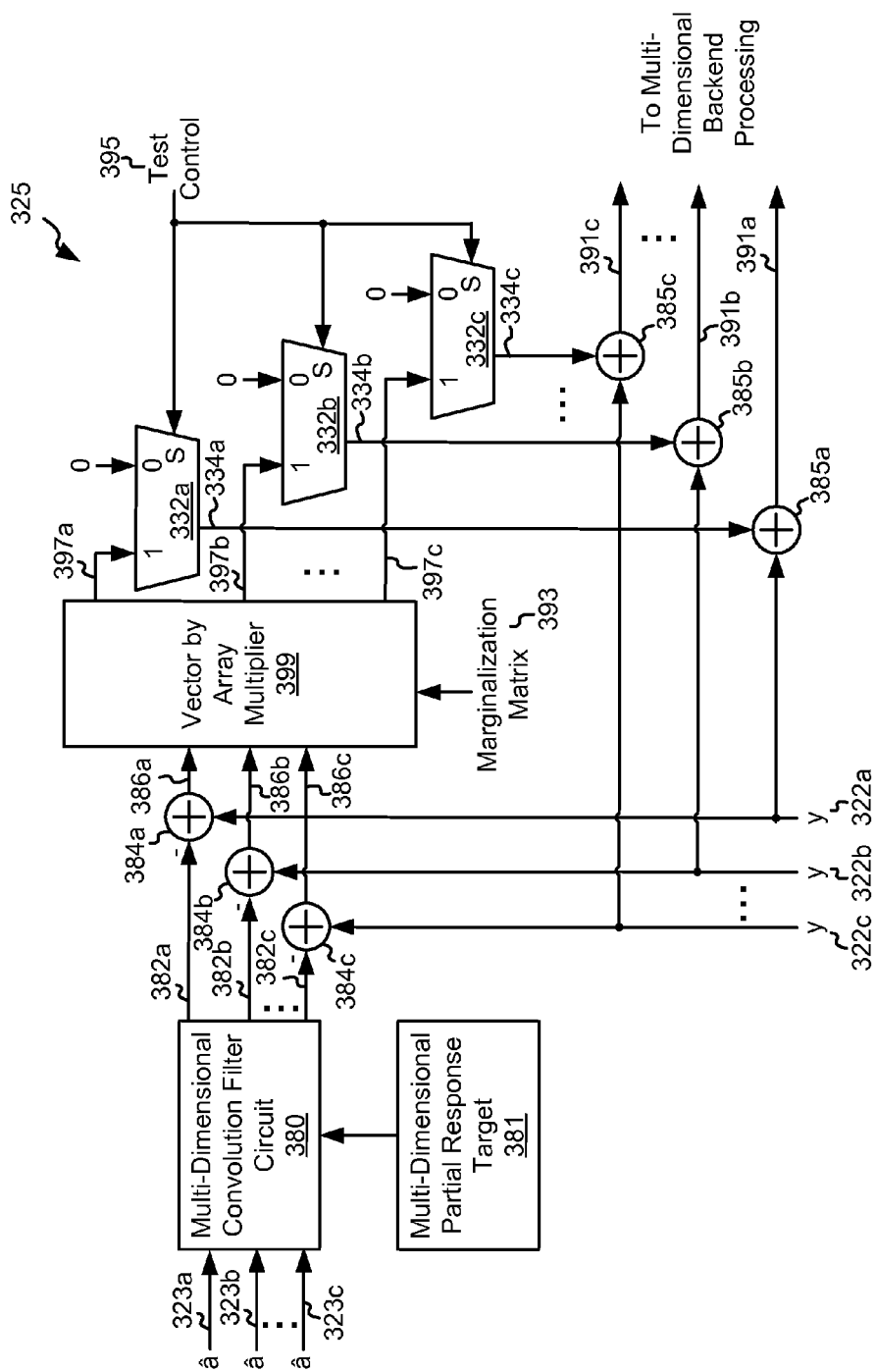
FIG. 3b shows one implementation of the multi-dimensional signal marginalization circuit of FIG. 3a that may be used in accordance with various embodiments of the present invention.

An array of equalized outputs consisting of equalized outputs 322a, 322b, 322c and an array of ideal outputs 323a, 323b, 323c are provided to multi-dimensional signal marginalization circuit 325. Multi-dimensional signal marginalization circuit 325 is operable to inject a portion of noise calculated based upon the noise derived from equalized outputs 322a, 322b, 322c. Turning to FIG. 3b, one implementation of multi-dimensional signal marginalization circuit 325 is shown in accordance with various embodiments of the present invention. As shown in the example implementation of FIG. 3b, multi-dimensional signal marginalization circuit 325 includes a multi-dimensional convolution filter circuit 380. Multi-dimensional convolution filter circuit 380 applies target filtering on ideal outputs 323a, 323b, 323c based upon a multi-dimensional partial response target 381. Multi-dimensional convolution filter circuit 380 may be any multi-dimensional target filter as is known in the art. The result of the target filtering are filtered outputs 382a, 382b, 382c that correspond to respective ones of ideal outputs 323a, 323b, 323c. Filtered outputs 382a, 382b, 382c are provided to respective summation circuits 384a, 384b, 384c where they are subtracted from equalized outputs 322a, 322b, 322c to yield error outputs 386a, 386b, 386c in accordance with the following equation:

$$e(k,n) = y(k,n) - y_{ideal}(k,n),$$

where e(k,n) indicates the error outputs 386a, 386b, 386c; y(k,n) indicates the equalized outputs 322a, 322b, 322c; and $y_{ideal}(k,n)$ indicates the filtered outputs 382a, 382b, 382c.

The vector of error outputs 386a, 386b, 386c are provided to a vector by array multiplier circuit 399 where the vector is multiplied by a marginalization matrix 393 to yield a vector of marginalized errors 397a, 397b, 397c. Marginalized errors 397a, 397b, 397c may be represented by the following equation:

$$e'(k,n) = A \cdot e(k,n)$$

where e'(k,n) indicates the vector of marginalized errors, and A indicates the marginalization matrix.

A group of selector circuits 332a, 332b, 332c selects either one of the marginalized errors 397a, 397b, 397c or a zero value as a corresponding offset value 334a, 334b, 334c based upon an assertion level of a test control 395. Where test control 395 indicates a test scenario where system marginalization is desired, selector circuit 332a provides marginalized error 397a as offset value 334a, selector circuit 332b provides marginalized error 397b as offset value 334b, and selector circuit 332c provides marginalized error 397c as offset value 334c. Alternatively, where normal operation is to be performed, test control 395 is de-asserted causing selector circuit 332a to provide a zero value as offset value 334a, selector circuit 332b to provide a zero value as offset value 334b, and selector circuit 332c to provide a zero value as offset value 334c.

Offset values 334a, 334b, 334c are provided to respective summation circuits 385a, 385b, 385c where they are added to respective equalized outputs 322a, 322b, 322c to yield noise injected outputs 391a, 391b, 391c. Thus, where test control 395 is asserted, equalized outputs 322a, 322b, 322c are modified by injecting the marginalized error values to cause a corresponding operational marginalization of the system in which data processing circuit 300 is implemented. Noise injected outputs 391a, 391b, 391c are provided to multi-dimensional back end processing circuitry that is explained in relation to FIG. 3a.

Referring again to FIG. 3a, noise injected outputs 391a, 391b, 391c are provided to a multi-dimensional sample buffer circuit 375 where they are stored. In addition, noise injected outputs 391a, 391b, 391c are provided directly to a multi-dimensional data detector circuit 326 as are known in the art. Sample buffer circuit 375 includes sufficient memory to maintain one or more codewords until processing of that codeword is completed through multi-dimensional data detector circuit 326 and a multi-dimensional data decoder circuit 350 including, where warranted, multiple "global iterations" defined as passes through both multi-dimensional data detector circuit 326 and multi-dimensional data decoder circuit 350 and/or "local iterations" defined as passes through multi-dimensional data decoder circuit 350 during a given global iteration. Multi-dimensional sample buffer circuit 375 stores the received data as buffered data 377.

Multi-dimensional data detector circuit 326 is a data detector circuit capable of producing a detected output 327 by applying a data detection algorithm to a vector of data inputs derived from different heads. As some examples, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Multi-dimensional data detector circuit 326 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 327 is provided to a multi-dimensional central queue memory circuit 360 that operates to buffer data passed between multi-dimensional data detector circuit 326 and multi-dimensional data decoder circuit 350. When multi-dimensional data decoder circuit 350 is available, multi-dimensional data decoder circuit 350 receives detected output 327 from multi-dimensional central queue memory 360 as a decoder input 356. Multi-dimensional data decoder circuit 350 applies a multi-dimensional data decoding algorithm to decoder input 356 in an attempt to recover originally written data. The result of the data decoding algorithm is provided as a decoded output 354. Similar to detected output 327, decoded output 354 may include both hard decisions and soft decisions. For example, data decoder circuit 350 may be any data decoder circuit known in the art that is capable of applying a decoding algorithm to a received input. Multi-dimensional data decoder circuit 350 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 350 provides the result of the data decoding algorithm as a data output 374. Data output 374 is provided to a hard decision output circuit 396 where the data is reordered before providing a series of ordered data sets as a data output 398.

One or more iterations through the combination of multi-dimensional data detector circuit 326 and multi-dimensional data decoder circuit 350 may be made in an effort to converge on the originally written data set. As mentioned above, processing through both the data detector circuit and the data decoder circuit is referred to as a "global iteration". For the first global iteration, multi-dimensional data detector circuit 326 applies the data detection algorithm without guidance from a decoded output. For subsequent global iterations, multi-dimensional data detector circuit 326 applies the data detection algorithm to buffered data 377 as guided by decoded output 354. Decoded output 354 is received from central queue memory 360 as a detector input 329.

During each global iteration it is possible for data decoder circuit 350 to make one or more local iterations including application of the data decoding algorithm to decoder input 356. For the first local iteration, multi-dimensional data decoder circuit 350 applies the data decoder algorithm without guidance from a decoded output 352. For subsequent local iterations, multi-dimensional data decoder circuit 350 applies the data decoding algorithm to decoder input 356 as guided by a previous decoded output 352. In some embodiments of the present invention, a default of ten local iterations is allowed for each global iteration.

Figure 4A:
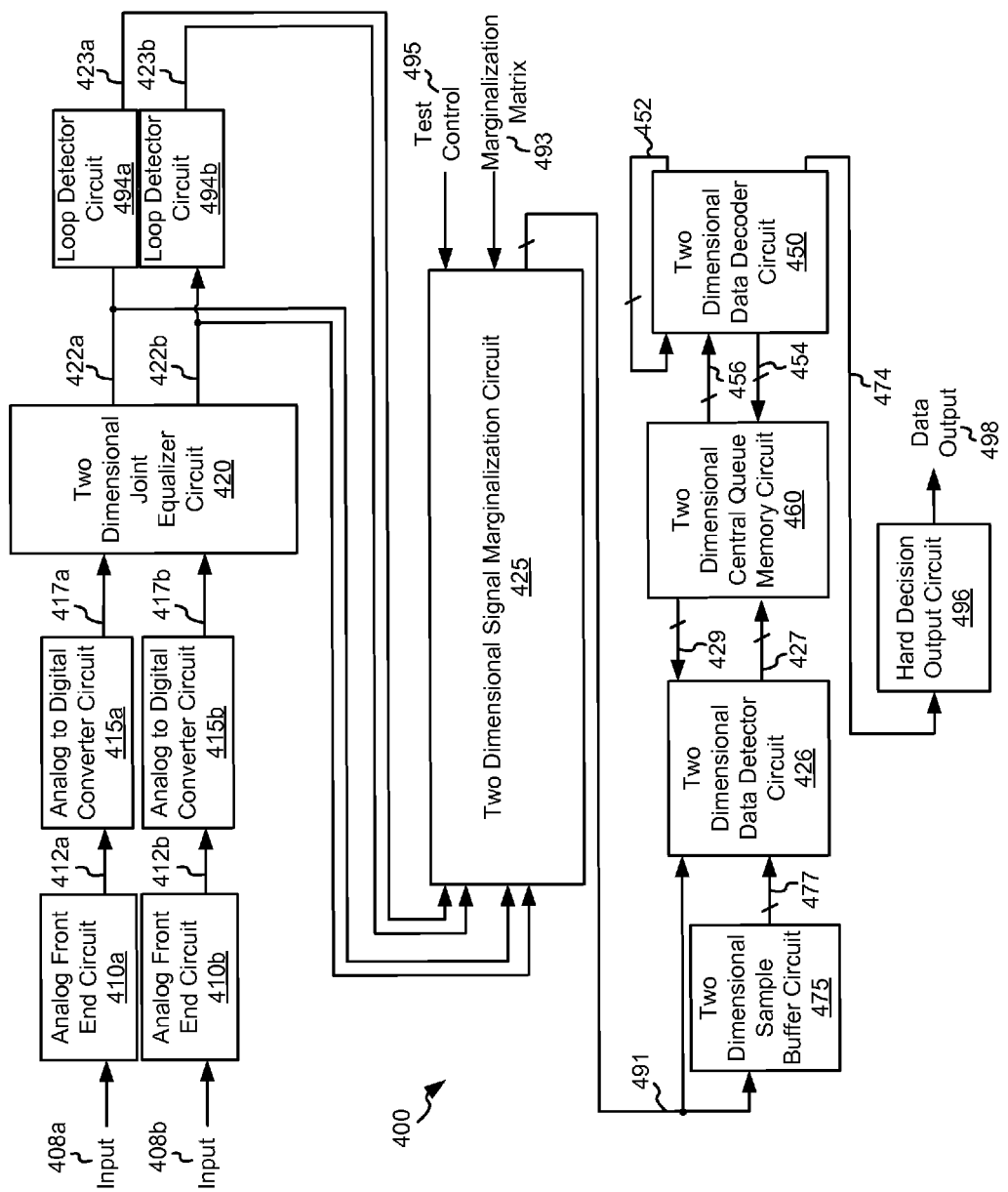
FIG. 4a shows a data processing circuit including a two dimensional signal marginalization circuit in accordance with some embodiments of the present invention.

Turning to FIG. 4a, a data processing circuit 400 is shown that includes a two-dimensional signal marginalization circuit 425 in accordance with some embodiments of the present invention. Data processing circuit 400 includes a number of analog front end circuits 410 (410a, 410b) that receive respective ones of analog inputs 408 (408a, 408b) from one of two respective read heads (not shown). Each of analog front end circuits 410 processes a respective one of the analog signals 408 and provides a processed analog signal 412 (one of 412a, 412b) to a respective analog to digital converter circuit 415 (one of 415a, 415b). Each of analog front end circuits 410 may include, but is not limited to, an analog filter and an amplifier circuit as are known in the art. Based upon the disclosure provided herein, one of ordinary skill in the art will recognize a variety of circuitry that may be included as part of analog front end circuit 410. In some cases, analog input signal 408 is derived from a read/write head assembly (not shown) that is disposed in relation to a storage medium (not shown). Based upon the disclosure provided herein, one of ordinary skill in the art will recognize a variety of sources from which the analog input signals 408 may be derived.

Each of the analog to digital converter circuits 415 converts a respective one of the processed analog signals 412 into a respective corresponding series of digital samples 417 (one of 417a, 417b). Each of the analog to digital converter circuits 415 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Each of the series of digital samples 417 are provided to a two-dimensional joint equalizer circuit 420. Two-dimensional joint equalizer circuit 420 applies a two-dimensional equalization algorithm to the sets of digital samples 417a, 417b to yield equalized outputs 422a, 422b each corresponding to one of analog inputs 408a, 408b. In some embodiments of the present invention, two-dimensional joint equalizer circuit equalizer circuit 420 is a two-dimensional digital finite impulse response filter circuit as are known in the art.

Equalized output 422a is provided to a loop detector circuit 494a, and equalized output 422b is provided to a loop detector circuit 494b. Each of loop detector circuits 494 may be any circuit known in the art that applies some type of algorithm designed to return a representation of the data from which a corresponding input signal 408 was derived. In one particular embodiment of the present invention, each of the decisions from the loop detector circuits 494 may be used to determine timing feedback and other operations designed to align the sampling of the corresponding analog to digital converter circuit 415 (e.g., output 423a of loop detector circuit 494a provided to analog to digital converter circuit 415a) with the received data set, and/or to adjust a gain applied by the corresponding analog front end circuit 410 (e.g., output 423a of loop detector circuit 494a provided to analog to analog front end circuit 410a). Based upon the disclosure provided herein, one of ordinary skill in the art will recognize a variety of circuits capable of providing a representation of the data from which analog signal 408 was derived that may be used in relation to different embodiments of the present invention. Each of the loop detector circuits 494 provides a respective ideal output 423 that corresponds to an expected value based upon filtering.

Figure 4B:
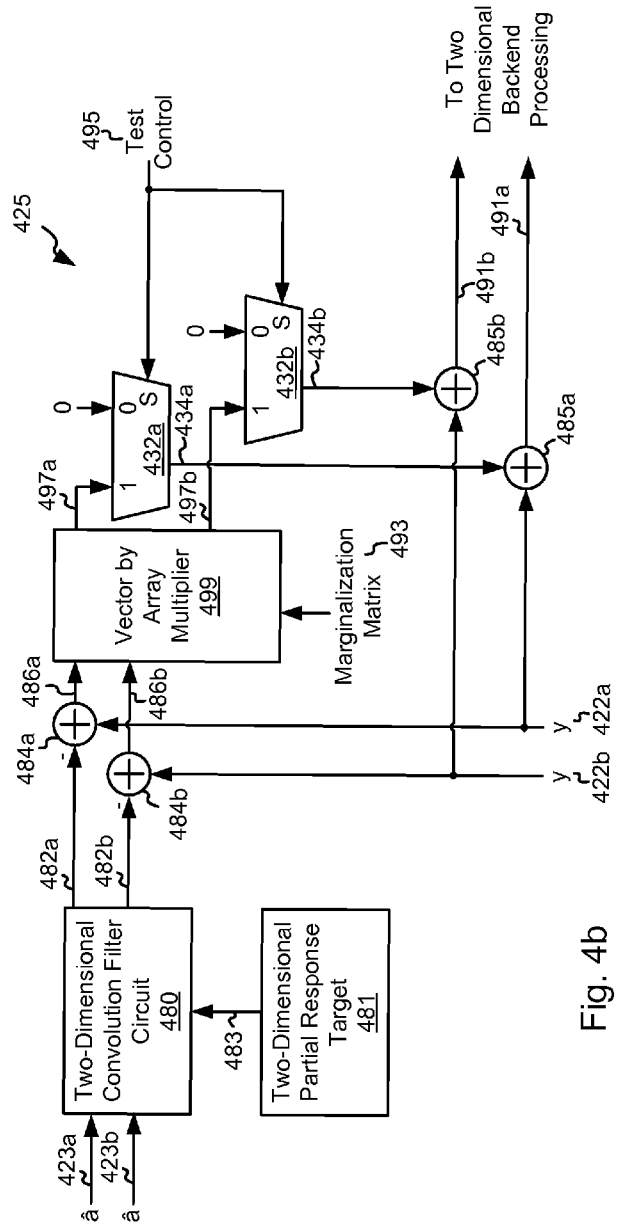
FIG. 4b shows one implementation of the two dimensional signal marginalization circuit of FIG. 4a that may be used in accordance with various embodiments of the present invention.

An array of equalized outputs consisting of equalized outputs 422a, 422b and an array of ideal outputs 423a, 423b are provided to two-dimensional signal marginalization circuit 425. Two-dimensional signal marginalization circuit 425 is operable to inject a portion of noise calculated based upon the noise derived from equalized outputs 422a, 422b. Turning to FIG. 4b, one implementation of two-dimensional signal marginalization circuit 425 is shown in accordance with various embodiments of the present invention. As shown in the example implementation of FIG. 4b, two-dimensional signal marginalization circuit 425 includes a two-dimensional convolution filter circuit 480. Two-dimensional convolution filter circuit 480 applies target filtering on ideal outputs 423a, 423b based upon a two-dimensional partial response target 481. Two-dimensional convolution filter circuit 480 may be any two-dimensional target filter as is known in the art. The result of the target filtering are filtered outputs 482a, 482b that correspond to respective ones of ideal outputs 423a, 423b. Filtered outputs 482a, 482b are provided to respective summation circuits 484a, 484b where they are subtracted from equalized outputs 422a, 422b to yield error outputs 486a, 486b in accordance with the following equation:

$$e(k,n) = y(k,n) - y_{ideal}(k,n),$$

where e(k,n) indicates the error outputs 486a, 486b; y(k,n) indicates the equalized outputs 422a, 422b; and $y_{ideal}$(k,n) indicates the filtered outputs 482a, 482b.

The vector of error outputs 486a, 486b are provided to a vector by array multiplier circuit 499 where the vector is multiplied by a marginalization matrix 493 to yield a vector of marginalized errors 497a, 497b. Marginalized errors 497a, 497b may be represented by the following equation:

$$e'(k,n) = A \cdot e(k,n)$$

where e'(k,n) indicates the vector of marginalized errors, and A indicates the marginalization matrix.

A group of selector circuits 432a, 432b selects either one of the marginalized errors 497a, 497b or a zero value as a corresponding offset value 434a, 434b based upon an assertion level of a test control 495. Where test control 495 indicates a test scenario where system marginalization is desired, selector circuit 432a provides marginalized error 497a as offset value 434a, and selector circuit 432b provides marginalized error 497b as offset value 434b. Alternatively, where normal operation is to be performed, test control 495 is de-asserted causing selector circuit 432a to provide a zero value as offset value 434a, and selector circuit 432b to provide a zero value as offset value 434b.

Offset values 434a, 434b are provided to respective summation circuits 485a, 485b where they are added to respective equalized outputs 422a, 422b to yield noise injected outputs 491a, 491b. Thus, where test control 495 is asserted, equalized outputs 422a, 422b are modified by injecting the marginalized error values to cause a corresponding operational marginalization of the system in which data processing circuit 400 is implemented. Noise injected outputs 491a, 491b are provided to two-dimensional back end processing circuitry that is explained in relation to FIG. 4a.

Referring again to FIG. 4a, noise injected outputs 491a, 491b are provided to a two-dimensional sample buffer circuit 475 where they are stored. In addition, noise injected outputs 491a, 491b are provided directly to a two-dimensional data detector circuit 426 as are known in the art. Sample buffer circuit 475 includes sufficient memory to maintain one or more codewords until processing of that codeword is completed through two-dimensional data detector circuit 426 and a two-dimensional data decoder circuit 450 including, where warranted, twople "global iterations" defined as passes through both two-dimensional data detector circuit 426 and two-dimensional data decoder circuit 450 and/or "local iterations" defined as passes through two-dimensional data decoder circuit 450 during a given global iteration. Two-dimensional sample buffer circuit 475 stores the received data as buffered data 477.

Two-dimensional data detector circuit 426 is a data detector circuit capable of producing a detected output 427 by applying a data detection algorithm to a vector of data inputs derived from different heads. As some examples, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Two-dimensional data detector circuit 426 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 427 is provided to a two-dimensional central queue memory circuit 460 that operates to buffer data passed between two-dimensional data detector circuit 426 and two-dimensional data decoder circuit 450. When two-dimensional data decoder circuit 450 is available, two-dimensional data decoder circuit 450 receives detected output 427 from two-dimensional central queue memory 460 as a decoder input 456. Two-dimensional data decoder circuit 450 applies a two-dimensional data decoding algorithm to decoder input 456 in an attempt to recover originally written data. The result of the data decoding algorithm is provided as a decoded output 454. Similar to detected output 427, decoded output 454 may include both hard decisions and soft decisions. For example, data decoder circuit 450 may be any data decoder circuit known in the art that is capable of applying a decoding algorithm to a received input. Two-dimensional data decoder circuit 450 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 450 provides the result of the data decoding algorithm as a data output 474. Data output 474 is provided to a hard decision output circuit 496 where the data is reordered before providing a series of ordered data sets as a data output 498.

One or more iterations through the combination of two-dimensional data detector circuit 426 and two-dimensional data decoder circuit 450 may be made in an effort to converge on the originally written data set. As mentioned above, processing through both the data detector circuit and the data decoder circuit is referred to as a "global iteration". For the first global iteration, two-dimensional data detector circuit 426 applies the data detection algorithm without guidance from a decoded output. For subsequent global iterations, two-dimensional data detector circuit 426 applies the data detection algorithm to buffered data 477 as guided by decoded output 454. Decoded output 454 is received from central queue memory 460 as a detector input 429.

During each global iteration it is possible for data decoder circuit 450 to make one or more local iterations including application of the data decoding algorithm to decoder input 456. For the first local iteration, two-dimensional data decoder circuit 450 applies the data decoder algorithm without guidance from a decoded output 452. For subsequent local iterations, two-dimensional data decoder circuit 450 applies the data decoding algorithm to decoder input 456 as guided by a previous decoded output 452. In some embodiments of the present invention, a default of ten local iterations is allowed for each global iteration.

Figure 5A:
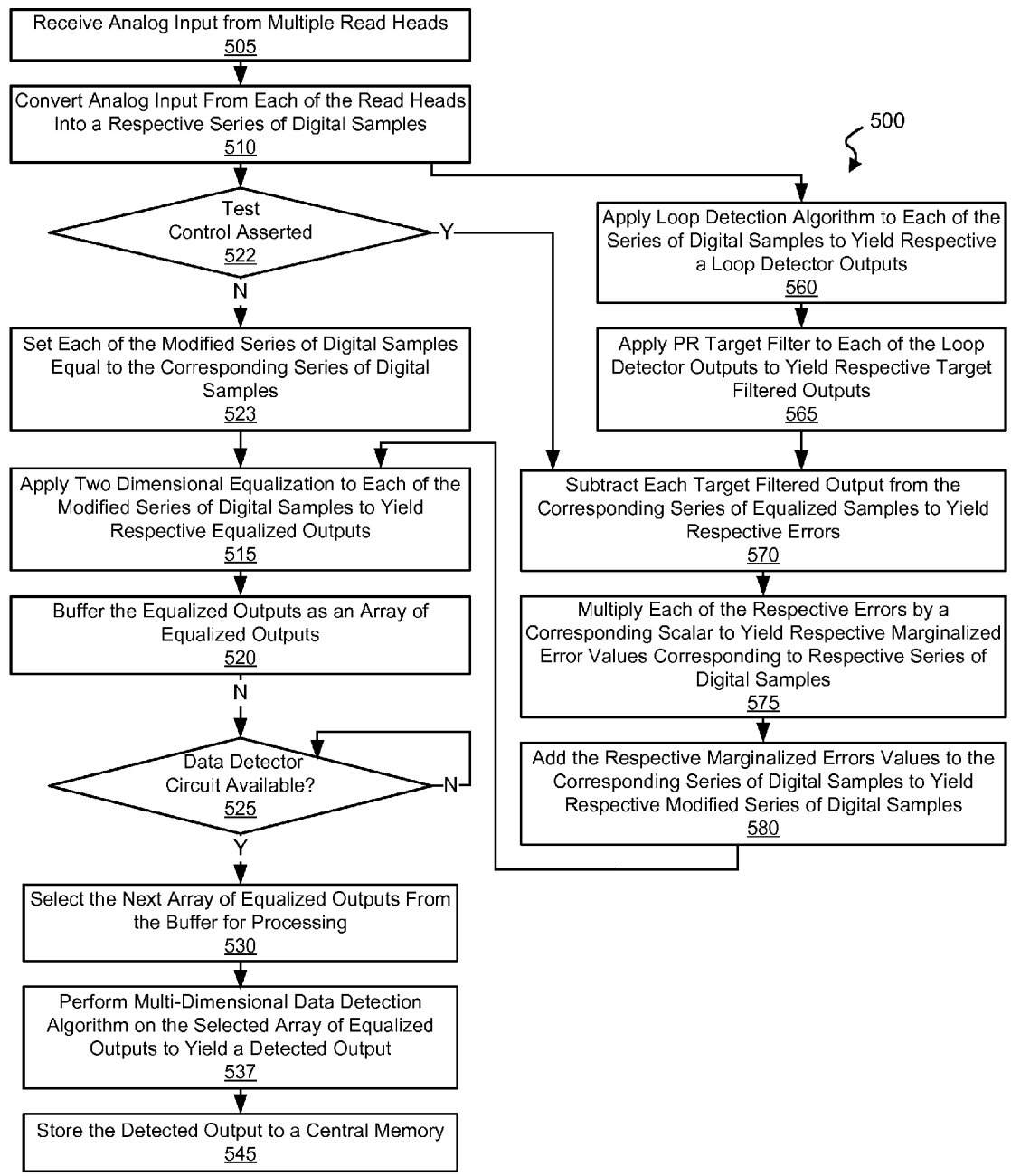
FIGS. 5a-5b are flow diagrams showing a method for data processing implementing multi-dimensional marginalization using individual dimension noise injection in accordance with some embodiments of the present invention.
Figure 5B:
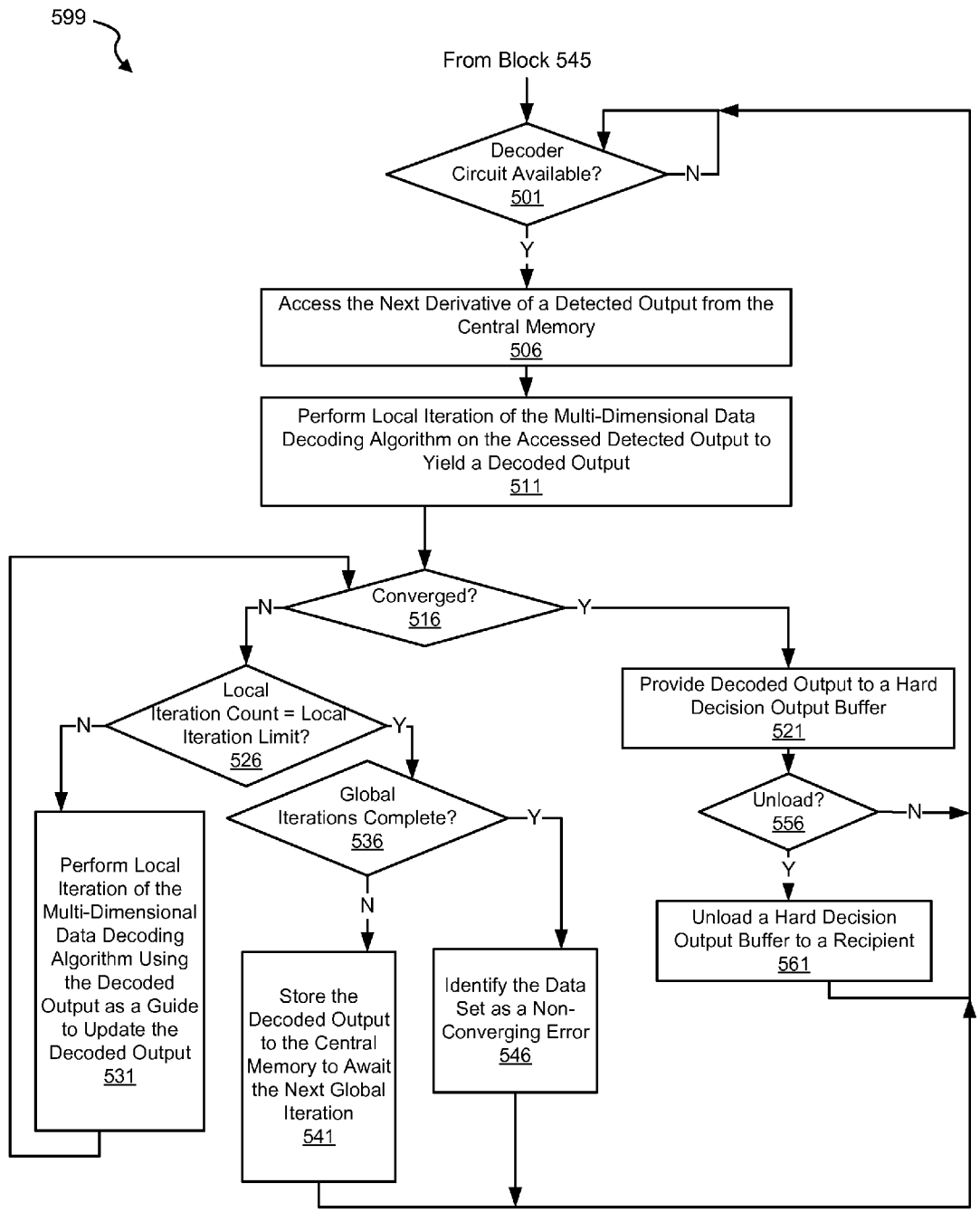

Turning to FIGS. 5a-5b are flow diagrams 500, 599 showing a method for data processing relying on multi-dimensional noise injection in accordance with some embodiments of the present invention. Following flow diagram 500 of FIG. 5a, multiple analog inputs are received from respective read heads (block 505). The analog inputs may be derived from, for example, a storage medium. Based upon the disclosure provided herein, one of ordinary skill in the art will recognize a variety of sources of the analog inputs. Each of the analog inputs is converted to a respective series of digital samples (block 510). This conversion may be done using analog to digital converter circuits or systems as are known in the art. Of note, any circuit known in the art that is capable of converting an analog signal into a series of digital samples representing the received analog signal may be used.

A loop detection algorithm is applied individually to each of the series of digital samples to yield respective loop outputs (block 560). A loop detector applying the loop detection algorithm that generates decisions on data bits. The loop control circuits in the channel use these decisions to generate feedback for driving the loops in the correct direction. The loop detection algorithm may be applied by any circuit known in the art that applies some type of algorithm designed to return a representation of the data from which the analog input was derived. In one particular embodiment of the present invention, the loop detection algorithm is operable to determine bit decisions used to aid in timing feedback and other operations designed to align the sampling related to the analog to digital conversion, and/or to adjust a gain applied by an analog front end circuit. Based upon the disclosure provided herein, one of ordinary skill in the art will recognize a variety of loop detection algorithms capable of providing a representation of the data from which the analog input was derived that may be used in relation to different embodiments of the present invention.

A partial response target filtering is applied to each loop detector output to yield respective target filtered outputs (block 565). The partial response target filtering may be done by any circuit known in the art that is capable of applying target based filtering to an input signal to yield an output conformed to a target. The resulting target filtered output is an ideal approximation of the respective series of digital samples.

It is determined whether a test control is asserted (block 522). Where the test control is asserted (block 522), each of the target filtered outputs is subtracted from a respective one of the series of digital samples to yield respective errors as an array of errors (block 570). The errors may be calculated in accordance with the following equation:

$$e(k,n)=x(k,n)-x_{ideal}(k,n),$$

where e(k,n) is the error, x(k,n) is the digital samples, and $x_{ideal}(k,n)$ is the target filtered output. Each element of the array of errors is multiplied by a respective scalar value ($\alpha_1$, $\alpha_2$, $\alpha_3$) to yield an array of marginalized errors (block 575). The array of marginalized errors may be calculated in accordance with the following equation:

$$e'(k,n)=\{\alpha_1 \cdot e(1,n), \alpha_2 \cdot e(2,n), \alpha_3 \cdot e(3,n)\},$$

where e'(k,n) is the array of marginalized errors.

The scalar values each correspond to a read head from which the analog data was originally received. These marginalized errors are added to the corresponding digital samples to yield respective modified series of digital samples (block 580). The modified series of digital samples x'(k,n) may be calculated in accordance with the following equation:

$$x'(k,n)=x(k,n)+e'(k,n).$$

These respective noise marginalized outputs is used to replace the respective modified series of digital samples.

Alternatively, where the test control is not asserted (block 522), each of the modified series of digital samples is set equal to the corresponding series of digital samples (block 523). The modified series of digital samples are provided to a multi-dimensional equalization circuit. The multi-dimensional equalization circuit applies a multi-dimensional equalization to each of the modified series of digital samples incorporating information from the other modified series of digital samples to yield respective equalized outputs (block 515). In some embodiments of the present invention, the equalization is done using a multi-dimensional digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention.

Whether or not the test control is asserted (block 522), the equalized outputs (modified or unmodified) are buffered as an array of equalized outputs (block 520). The array of equalized outputs includes one equalized output corresponding to each of the multiple read heads. It is determined whether a data detector circuit is available to process the buffered equalized output (block 525). Where a data detector circuit is available to process a data set (block 525), the next available array of equalized outputs from the buffer is selected for processing (block 530). A multi-dimensional data detection algorithm is then applied to the selected array of equalized outputs to yield a detected output (block 537). The data detection algorithm may be, for example, a Viterbi algorithm data detection or a maximum a posteriori data detection algorithm. The detected output (or a derivative thereof) is then stored to a central memory (block 545).

Turning to FIG. 5b and following flow diagram 599, it is determined whether a data decoder circuit is available (block 501) in parallel to the previously described data detection process of FIG. 5a. The data decoder circuit may be, for example, a low density parity check data decoder circuit as are known in the art. Where the data decoder circuit is available (block 501) the next derivative of a detected output is selected from the central memory (block 506). The derivative of the detected output may be, for example, an interleaved (shuffled) version of a detected output from the data detector circuit. A first local iteration of a data decoding algorithm is applied by the data decoder circuit to the selected detected output to yield a decoded output (block 511). It is then determined whether the decoded output converged (e.g., resulted in the originally written data as indicated by the lack of remaining unsatisfied checks) (block 516).

Where the decoded output converged (block 516), it is provided as a decoded output codeword to a hard decision output buffer (e.g., a re-ordering buffer) (block 521). It is determined whether the received output codeword is either sequential to a previously reported output codeword in which case reporting the currently received output codeword immediately would be in order, or that the currently received output codeword completes an ordered set of a number of codewords in which case reporting the completed, ordered set of codewords would be in order (block 556). Where the currently received output codeword is either sequential to a previously reported codeword or completes an ordered set of codewords (block 556), the currently received output codeword and, where applicable, other codewords forming an in order sequence of codewords are provided to a recipient as an output (block 561).

Alternatively, where the decoded output failed to converge (e.g., errors remain) (block 516), it is determined whether the number of local iterations already applied equals the maximum number of local iterations (block 526). In some cases, a default seven local iterations are allowed per each global iteration. Based upon the disclosure provided herein, one of ordinary skill in the art will recognize another default number of local iterations that may be used in relation to different embodiments of the present invention. Where another local iteration is allowed (block 526), the multi-dimensional data decoding algorithm is applied to the selected data set using the decoded output as a guide to update the decoded output (block 531). The processes of blocks starting at block 516 are repeated for the next local iteration.

Alternatively, where all of the local iterations have occurred (block 526), it is determined whether all of the global iterations have been applied to the currently processing data set (block 536). Where the number of global iterations has not completed (block 536), the decoded output is stored to the central queue memory circuit to await the next global iteration (block 541). Alternatively, where the number of global iterations has completed (block 536), an error is indicated and the data set is identified as non-converging (block 546).

Figure 6B:
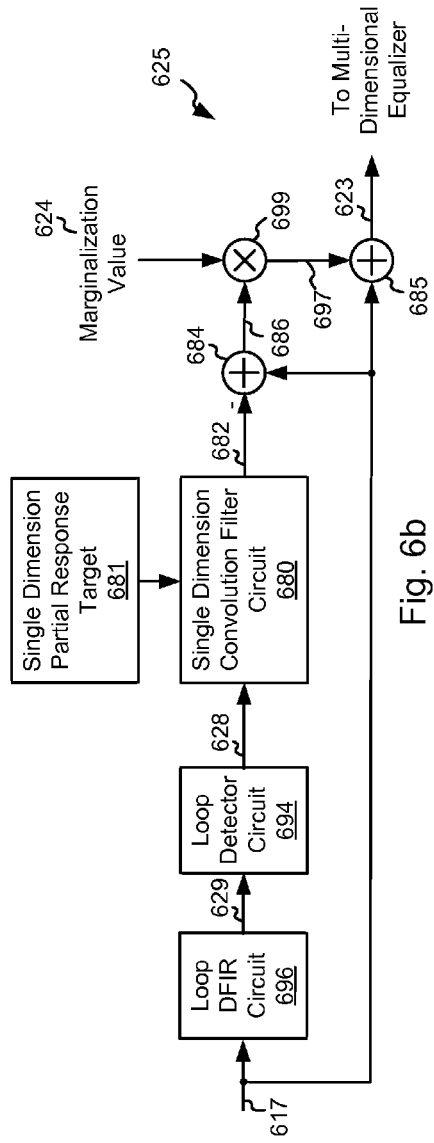
FIG. 6b shows one implementation of an individual dimension noise injection circuit that may be used in relation to the data processing circuit of FIG. 6a that may be used in accordance with various embodiments of the present invention.
Figure 6A:
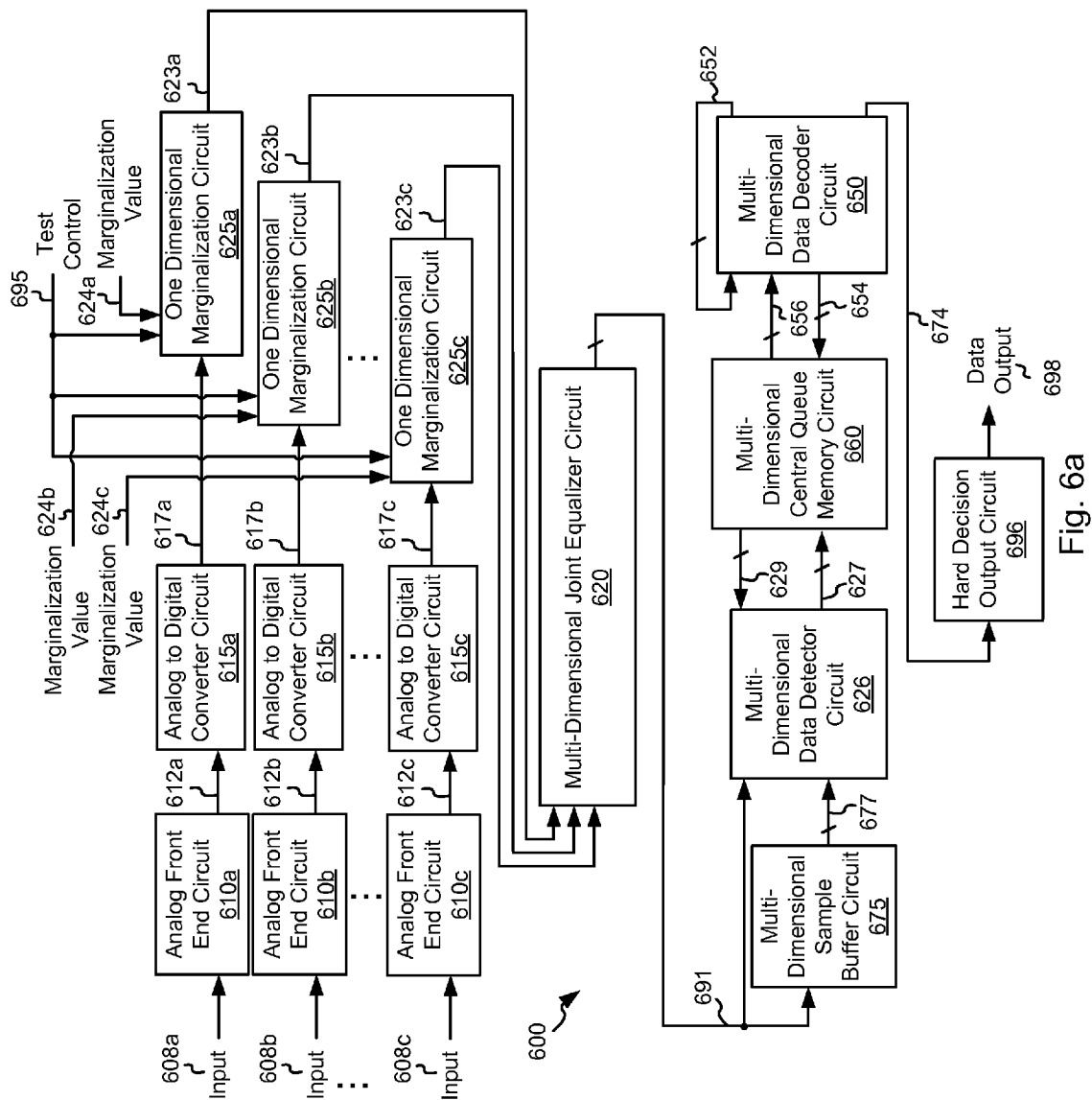
FIG. 6a shows a data processing circuit including multi-dimensional signal marginalization circuitry relying on individual dimension noise injection in accordance with one or more embodiments of the present invention.

Turning to FIG. 6a, a data processing circuit 600 is shown that includes a multi-dimensional signal marginalization circuitry relying on individual dimension noise injection in accordance with some embodiments of the present invention. Data processing circuit 600 includes a number of analog front end circuits 610 (610a, 610b, 610c) that receive respective ones of analog inputs 608 (608a, 608b, 608c) from respective read heads (not shown). Each of analog front end circuits 610 processes a respective one of the analog signals 608 and provides a processed analog signal 612 (one of 612a, 612b, 612c) to a respective analog to digital converter circuit 615 (one of 615a, 615b, 615c). Each of analog front end circuits 610 may include, but is not limited to, an analog filter and an amplifier circuit as are known in the art. Based upon the disclosure provided herein, one of ordinary skill in the art will recognize a variety of circuitry that may be included as part of analog front end circuit 610. In some cases, analog input signal 608 is derived from a read/write head assembly (not shown) that is disposed in relation to a storage medium (not shown). Based upon the disclosure provided herein, one of ordinary skill in the art will recognize a variety of sources from which the analog input signals 608 may be derived.

Each of the analog to digital converter circuits 615 converts a respective one of the processed analog signals 612 into a respective corresponding series of digital samples 617 (one of 617a, 617b, 617c). Each of the analog to digital converter circuits 615 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Each of the series of digital samples 617 are provided to a respective one dimensional marginalization circuit 625 (one of 625a, 625b, 625c). The digital marginalization circuits are operable to: (1) apply target filtering to digital samples 617 to yield ideal outputs, (2) subtract the ideal outputs from the digital samples 617 to yield error values, and multiply the error values by a respective marginalization value 624 (one of 624a, 624b, 624c).

Turning to FIG. 6b, one implementation of an individual dimension noise injection circuit 625 is shown that may be used in relation to the data processing circuit of FIG. 6a in accordance with various embodiments of the present invention. As shown in the example implementation of FIG. 6b, individual dimension noise injection circuit 625 includes a loop DFIR circuit 696 that equalizes digital samples 617 to yield an equalized output 629. A loop detector circuit 694 receives equalized output 629 and applies a loop detection algorithm to the digital samples to yield a detected output 628. Detected output 628 is provided to a single dimension convolution filter 680 that applies target filtering on ideal detected output 628 based upon a single-dimensional partial response target 681. Single-dimensional convolution filter circuit 680 may be any single-dimensional target filter as is known in the art. The result of the target filtering is provided as a filtered output 682. Filtered output 682 is provided to a summation circuit 684 where it is subtracted from digital samples 617 to yield an error output 686 in accordance with the following equation:

$$e(n)=x(n)-x_{ideal}(n),$$

where e(n) indicates the error output 686; x(n) indicates digital samples 617; and $x_{ideal}(n)$ indicates filtered output 682.

Error output 686 is multiplied by marginalization value 624 using a multiplier circuit 699 to yield a marginalized error 697. Marginalized error 697 may be represented by the following equation:

$$e'(n)=\alpha \cdot e(n),$$

where e'(n) indicates the vector of marginalized errors, and a indicates the marginalization value 624. Marginalized error 697 is re-added to digital samples 617 by a summation circuit 685 to yield a series of modified digital samples 623 that are provided to a multi-dimensional equalizer of FIG. 6a.

The modified digital samples 623 are set equal to the original digital samples 617 whenever a test control 695 is de-asserted indicating normal operation of circuit 600. Referring again to FIG. 6a, each of the series of modified digital samples 623 (623a, 623b, 623c) is provided to a multi-dimensional joint equalizer circuit 620. Multi-dimensional joint equalizer circuit 620 applies a multi-dimensional equalization algorithm to the sets of modified digital samples 623a, 623b, 623c to yield a vector of equalized outputs 691 each corresponding to one of analog inputs 608a, 608b, 608c. In some embodiments of the present invention, multi-dimensional joint equalizer circuit equalizer circuit 620 is a multi-dimensional digital finite impulse response filter circuit as are known in the art.

The vector of equalized outputs 691 is provided to a multi-dimensional sample buffer circuit 675 where they are stored. In addition, the vector equalized outputs 691 is provided directly to a multi-dimensional data detector circuit 626 as are known in the art. Sample buffer circuit 675 includes sufficient memory to maintain one or more codewords until processing of that codeword is completed through multi-dimensional data detector circuit 626 and a multi-dimensional data decoder circuit 650 including, where warranted, multiple "global iterations" defined as passes through both multi-dimensional data detector circuit 626 and multi-dimensional data decoder circuit 650 and/or "local iterations" defined as passes through multi-dimensional data decoder circuit 650 during a given global iteration. Multi-dimensional sample buffer circuit 675 stores the received data as buffered data 677.

Multi-dimensional data detector circuit 626 is a data detector circuit capable of producing a detected output 627 by applying a data detection algorithm to a vector of data inputs derived from different heads. As some examples, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Multi-dimensional data detector circuit 626 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 627 is provided to a multi-dimensional central queue memory circuit 660 that operates to buffer data passed between multi-dimensional data detector circuit 626 and multi-dimensional data decoder circuit 650. When multi-dimensional data decoder circuit 650 is available, multi-dimensional data decoder circuit 650 receives detected output 627 from multi-dimensional central queue memory 660 as a decoder input 656. Multi-dimensional data decoder circuit 650 applies a multi-dimensional data decoding algorithm to decoder input 656 in an attempt to recover originally written data. The result of the data decoding algorithm is provided as a decoded output 654. Similar to detected output 627, decoded output 654 may include both hard decisions and soft decisions. For example, data decoder circuit 650 may be any data decoder circuit known in the art that is capable of applying a decoding algorithm to a received input. Multi-dimensional data decoder circuit 650 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 650 provides the result of the data decoding algorithm as a data output 674. Data output 674 is provided to a hard decision output circuit 696 where the data is reordered before providing a series of ordered data sets as a data output 698.

One or more iterations through the combination of multi-dimensional data detector circuit 626 and multi-dimensional data decoder circuit 650 may be made in an effort to converge on the originally written data set. As mentioned above, processing through both the data detector circuit and the data decoder circuit is referred to as a "global iteration". For the first global iteration, multi-dimensional data detector circuit 626 applies the data detection algorithm without guidance from a decoded output. For subsequent global iterations, multi-dimensional data detector circuit 626 applies the data detection algorithm to buffered data 677 as guided by decoded output 654. Decoded output 654 is received from central queue memory 660 as a detector input 629.

During each global iteration it is possible for data decoder circuit 650 to make one or more local iterations including application of the data decoding algorithm to decoder input 656. For the first local iteration, multi-dimensional data decoder circuit 650 applies the data decoder algorithm without guidance from a decoded output 652. For subsequent local iterations, multi-dimensional data decoder circuit 650 applies the data decoding algorithm to decoder input 656 as guided by a previous decoded output 652. In some embodiments of the present invention, a default of ten local iterations is allowed for each global iteration.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for out of order data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
   a first analog to digital converter circuit operable to convert a first input into a first series of digital samples;
   a second analog to digital converter circuit operable to convert a second input into a second series of digital samples;
   a multi-dimensional system marginalization circuit operable to apply a marginalization algorithm to a combination of the first series of digital samples and the second series of digital samples to yield a first marginalized input corresponding to the first series of digital samples and a second marginalized input corresponding to the second series of digital samples; and
   a processing circuit operable to apply a multi-dimensional data processing algorithm to a combination of the first marginalized input and the second marginalized input to yield a data output.

2. The data processing system of claim 1, wherein the multi-dimensional system marginalization circuit comprises:
   a first loop detector circuit operable to apply a loop detection algorithm to a first loop input derived from the first series of digital samples to yield a first loop output;
   a second loop detector circuit operable to apply the loop detection algorithm to a second loop input derived from the second series of digital samples to yield a first loop output; and
   a multi-dimensional signal marginalization circuit operable to marginalize the first loop input based upon a combination of the first loop output, the first loop input, and the second loop input to yield a first marginalized output; and to marginalize the second loop input based upon a combination of the second loop output, the first loop input and the second loop input to yield a second marginalized output.

3. The data processing system of claim 2, wherein the multi-dimensional system marginalization circuit further comprises:
   a multi-dimensional joint equalizer circuit operable to apply a multi-dimensional equalization algorithm to a combination of the first series of digital samples and the second series of digital samples to yield the first loop input and the second loop input to yield a first equalized output corresponding to the first series of digital samples and a second equalized output corresponding to the second series of digital samples.

4. The data processing system of claim 3, wherein the multi-dimensional signal marginalization circuit comprises:
   a vector by array multiplication circuit operable to multiply an array of errors derived from a combination of the first loop output, the second loop output, the first equalized output and the second equalized output by a marginalization matrix to yield a first marginalized error corresponding to the first series of digital samples and a second marginalized error corresponding to the second series of digital samples;
   a first summation circuit operable to sum the first equalized output with the first marginalized error to yield the first marginalized input; and
   a second summation circuit operable to sum the second equalized output with the second marginalized error to yield the second marginalized input.

5. The data processing system of claim 4, wherein the marginalization matrix is user programmable.

6. The data processing system of claim 4, wherein the marginalization matrix is fixed.

7. The data processing system of claim 1, wherein the multi-dimensional system marginalization circuit comprises:
   a first loop detector circuit operable to apply a loop detection algorithm to the first series of digital samples to yield a first loop output;
   a first one dimensional marginalization circuit operable to modify the first series of digital samples to yield a first marginalized series of digital samples based at least in part on the first series of digital samples and a first marginalization value;
   a second loop detector circuit operable to apply the loop detection algorithm to the second series of digital samples to yield a second loop output; and
   a second one dimensional marginalization circuit operable to modify the second series of digital samples to yield a second marginalized series of digital samples based at least in part on the second series of digital samples and a second marginalization value.

8. The data processing system of claim 7, wherein the first marginalization value is user programmable.

9. The data processing system of claim 7, wherein the first marginalization value is less than unity.

10. The data processing system of claim 7, wherein the multi-dimensional system marginalization circuit further comprises:
    a multi-dimensional joint equalizer circuit operable to apply a multi-dimensional equalization algorithm to a combination of the first marginalized series of digital samples and the second marginalized series of digital samples to yield a first equalized output corresponding to the first series of digital samples and a second equalized output corresponding to the second series of digital samples.

11. The data processing system of claim 10, wherein the first one dimensional marginalization circuit comprises:
    a first summation circuit operable to subtract an ideal value derived from the first series of digital samples from the first series of digital samples to yield an error value;
    a multiplication circuit operable to multiply the error value by the first marginalization value to yield a product; and
    a second summation circuit operable to sum the product with the first series of digital samples to yield the first marginalized series of digital samples.

12. The data processing system of claim 11, wherein the multiplication circuit is a first multiplication circuit, the product is a first product, the ideal value is a first ideal value, the error value is a first error value, and the product is a first product, and wherein the second one dimensional marginalization circuit comprises:
- a third summation circuit operable to subtract a second ideal value derived from the second series of digital samples from the second series of digital samples to yield a second error value;
- a second multiplication circuit operable to multiply the second error value by the second marginalization value to yield a second product; and
- a fourth summation circuit operable to sum the second product with the second series of digital samples to yield the second marginalized series of digital samples.

13. The data processing system of claim 1, wherein the processing circuit comprises:
- a multi-dimensional data detector circuit operable to apply a multi-dimensional data detection algorithm to the combination of the first marginalized input and the second marginalized input to yield a detected output; and
- a multi-dimensional data decoder circuit operable to apply a multi-dimensional data decoding algorithm to a decoder input derived from the detected output to yield the data output.

14. The data processing system of claim 13, wherein the multi-dimensional data decoder circuit is a multi-dimensional low density parity check decoder circuit.

15. The data processing system of claim 13, wherein the multi-dimensional data detector circuit is selected from a group consisting of: a maximum a posteriori data detector circuit, and a Viterbi algorithm data detector circuit.

16. The data processing system of claim 1, wherein the system is implemented as an integrated circuit.

17. The data processing system of claim 1, wherein the system is implemented as part of a storage device including a storage medium.

18. The data processing system of claim 1, wherein the first input is derived from a first head aligned with a first track on the storage medium, and wherein the second input is derived from a second head aligned with a second track on the storage medium.

19. A method for data processing, the method comprising:
- receiving a first input derived from a first read head disposed in relation to a storage medium;
- receiving a second input derived from a second read head disposed in relation to the storage medium;
- generating a first noise component based at least in part on a combination of data derived from both the first input and second input;
- generating a second noise component based at least in part on the combination of data derived from both the first input and second input;
- multiplying a vector of the first noise component and the second noise component by a marginalization matrix to yield a first marginalized noise component corresponding to the first input and a second marginalized noise component corresponding to the second input;
- summing the first input with the first marginalized noise component to yield a first marginalized output; and
- summing the second input with the second marginalized noise component to yield a second marginalized output.

20. The method of claim 19, the method further comprising:
- applying a multi-dimensional data processing algorithm to a combination of the first marginalized output and the second marginalized output to yield a data output.

* * * * *